(12) United States Patent
Hori et al.

(10) Patent No.: US 7,607,366 B2
(45) Date of Patent: Oct. 27, 2009

(54) HYDRAULIC CONTROL APPARATUS FOR AUTOMATIC TRANSMISSION

(75) Inventors: Yoshiaki Hori, Saitama (JP); Kinya Mizuno, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 451 days.

(21) Appl. No.: 11/526,757

(22) Filed: Sep. 26, 2006

(65) Prior Publication Data

US 2007/0068297 A1 Mar. 29, 2007

(30) Foreign Application Priority Data

Sep. 29, 2005 (JP) .............................. 2005-284382

(51) Int. Cl.
*F16H 3/08* (2006.01)
(52) U.S. Cl. ........................................................ 74/331
(58) Field of Classification Search .................. 74/331, 74/335; 192/3.57, 3.58
See application file for complete search history.

(56) References Cited

U.S. PATENT DOCUMENTS 6,460,425 B1 * 10/2002 Bowen ........................ 74/331
2008/0220936 A1 * 9/2008 Kobayashi et al. ............ 477/70

FOREIGN PATENT DOCUMENTS

JP 2003-139167 A 5/2003

* cited by examiner

*Primary Examiner*—Dirk Wright
(74) *Attorney, Agent, or Firm*—Birch, Stewart, Kolasch & Birch, LLP (57) ABSTRACT

To alleviate shift shock of an automatic transmission provided with a twin clutch. An automatic transmission is provided with gear trains equal in number to the number of speed ratios between a primary shaft and a counter shaft. A first hydraulic clutch and second hydraulic clutch interrupt and connect the transmission of rotation between a crankshaft and the transmission. A changeover valve is provided to connect the pressure of a working fluid to any one of the first and second clutches. A pair of orifice control valves are disposed between the changeover valve and the first clutch and between the changeover valve and the second clutch, respectively. A pair of accumulators are disposed between the changeover valve and the first clutch and between the changeover valve and the second clutch, respectively.

16 Claims, 5 Drawing Sheets

HYDRAULIC CONTROL APPARATUS FOR AUTOMATIC TRANSMISSION

CROSS-REFERENCE TO RELATED APPLICATIONS

This nonprovisional application claims priority under 35 U.S.C. § 119(a) on Patent Application No. 2005-284382, filed in Japan on Sep. 29, 2006, the entirety of which is incorporated herein by reference.

BACKGROUND OF THE INVENTION

1. Field of the Invention

The present invention relates generally to hydraulic control apparatuses for automatic transmissions, and particularly to a hydraulic control apparatus for an automatic transmission suitably configured to suppress shock during shifting (shift shock).

2. Description of Background Art

Figure 5:
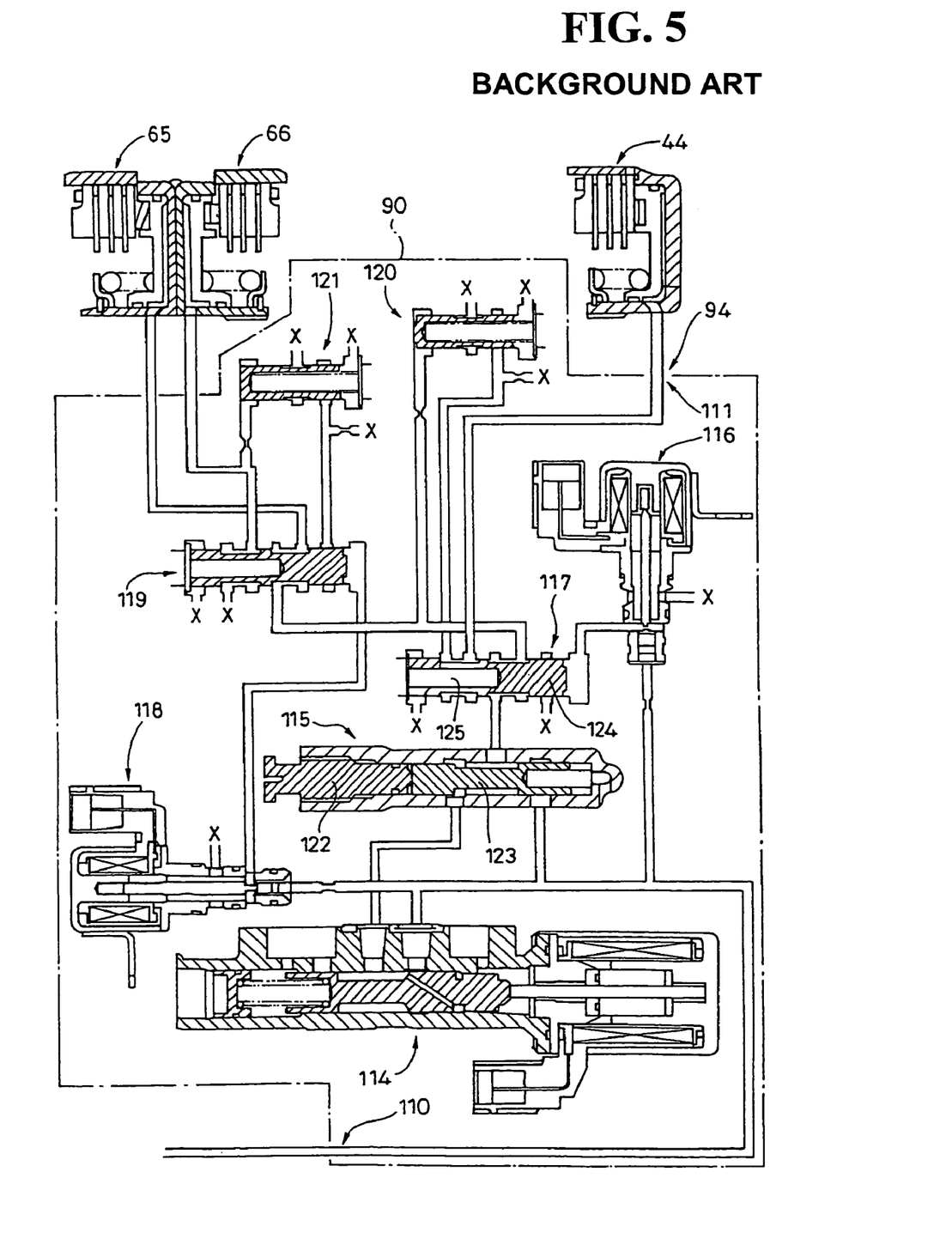
FIG. 5 is a hydraulic circuit diagram of a hydraulic control apparatus according to the background art.

FIG. 5 of the present application is a systematic diagram illustrating a hydraulic control apparatus for a hydraulic multiple disk clutch according to the background art. There are provided a 1st speed clutch 44, a 2nd speed clutch 65, and a 3rd speed clutch. A working fluid for each clutch is fed from a working fluid inlet port 110 to a valve body 90, in which its destination is determined. A linear solenoid valve 114 is a valve that controls the supply and interruption of the working fluid to an emergency valve 115. The emergency valve 115 normally feeds the working fluid to a 1-2 speed changeover valve 117; however, when the linear solenoid valve 114 fails to stop in an interrupting state, the emergency valve 115 is switched so that the working fluid is fed to the 1-2 speed changeover valve 117 with the linear solenoid valve 114 being bypassed.

A 1-2 speed selector solenoid 116 is provided to operate the spool 124 of the 1-2 speed changeover valve 117 for the supply and interruption of the working fluid. The 1-2 speed changeover valve 117 feeds the working fluid supplied from the linear solenoid valve 114 to either the 1st speed clutch 44 or a 2-3 speed changeover valve 119 in response to the position of the spool 124.

A 2-3 speed selector solenoid 118 is provided to feed or interrupt hydraulic pressure adapted to drive the spool of a 2-3 speed changeover valve 119. The 2-3 speed changeover valve 119 feeds the working fluid supplied from the 1-2 speed changeover valve 117 to either the 2nd speed clutch 65 or the 3rd speed clutch 66.

Hydraulic control valves 120 and 121 are provided to control discharge of the return oil from the hydraulic multiple disk clutches. The above-described hydraulic control apparatus for an automatic transmission is disclosed in Japanese Patent Laid-Open No. 2003-139167.

The hydraulic control apparatus for an automatic transmission described in Japanese Patent Laid-Open No. 2003-139167 has only one hydraulic control valve 121 serving as a valve that alleviates shift shock for the 2nd speed clutch 65 and 3rd clutch 66. This is because the valve 121 is actuated to drain the working fluid moderately, only when an upshift is implemented to change the first speed ratio to the second speed ratio or the second speed ratio to the third speed ratio. On the other hand, when a downshift is implemented, the valve 121 is prohibited from being actuated while placing priority on quickly draining the working fluid.

For a twin clutch of a multi-stage automatic transmission; however, two clutches are designed to operate both the upshift and downshift. It is desirable, therefore, that a hydraulic control valve, i.e., an orifice control valve be arranged to operate two clutches.

SUMMARY OF THE INVENTION

It is an object of the present invention to solve the problem of the background art and to provide a hydraulic control apparatus for an automatic transmission in which the hydraulic control valve is arranged to operate both twin clutches so that hydraulic control can be executable for any of upshift and downshift.

In order to achieve the above object, the present invention has a first feature in which, in a hydraulic control apparatus for an automatic transmission, including: a main shaft connected to an output shaft of an internal combustion engine via any one of a first clutch and a second clutch both actuated under hydraulic pressure; and a gear train transmitting rotation of the main shaft to a transmission output shaft; a speed ratio is determined by engagement and disengagement of the hydraulic clutch mechanism and engagement and disengagement of a dog clutch in the gear train; and a hydraulic circuit adapted to transmit a working fluid to the first clutch and the second clutch is provided for each of the first and second clutches individually.

A second feature of the present invention is that, in a hydraulic control apparatus for an automatic transmission, including: a main shaft connected to an output shaft of an internal combustion engine via any one of a first clutch and a second clutch both actuated under hydraulic pressure; and a gear train transmitting rotation of the main shaft to a transmission output shaft; in which a speed ratio is determined by engagement and disengagement of the hydraulic clutch mechanism and engagement and disengagement of a dog clutch in the gear train, the hydraulic control apparatus includes: a first oil passage adapted to supply working fluid to the first clutch; a second oil passage adapted to supply working fluid to the second clutch; a changeover valve adapted to connect pressure of a working fluid to any one of the first oil passage and the second oil passage; and an orifice control valve provided at a guiding branch formed on each of midways of the first oil passage and the second oil passage.

A third feature of the present invention is that the hydraulic control apparatus further includes an accumulator provided at a second guiding branch, in addition to the guiding branch, formed on each of the midways of the first oil passage and the second oil passage.

A fourth feature of the present invention is that the automatic transmission is a multi-stage automatic transmission, and the output shaft of the internal combustion engine is connected to the main shaft via the first clutch for an odd-numbered speed ratio and via the second clutch for an even-numbered speed ratio.

According to the present invention having the first feature, since a multi-stage shift is carried out by engagement and disengagement of the two clutches, one of the clutches is used for both upshift and downshift. When both the upshift and the downshift are executed, the hydraulic circuit can be controlled to operate the clutches.

According to the present invention having the second feature, since the orifice control valve is provided on the working fluid passage led to a corresponding one of the clutches so that the hydraulic pressure of the working fluid from each of the first clutch and second clutch is released moderately, a shift shock can be alleviated.

According to the present invention having the third feature, since the pressure accumulation of the accumulator is applied to both the first clutch and second clutch, the first and second clutches can be controllably switched in the precise timing of hydraulic changeover.

According to the present invention having the fourth feature, since the first clutch and second clutch are alternately operated for the odd-numbered speed ratio and the even-numbered speed ratio, respectively, quick shift operation can be performed.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

An embodiment of the present invention will now be described with reference to the accompanying drawings. The same reference numerals will be used to identify the same or similar elements throughout the several views. It should be noted that each of the drawings should be viewed in the direction of orientation of the reference numerals.

Figure 2:
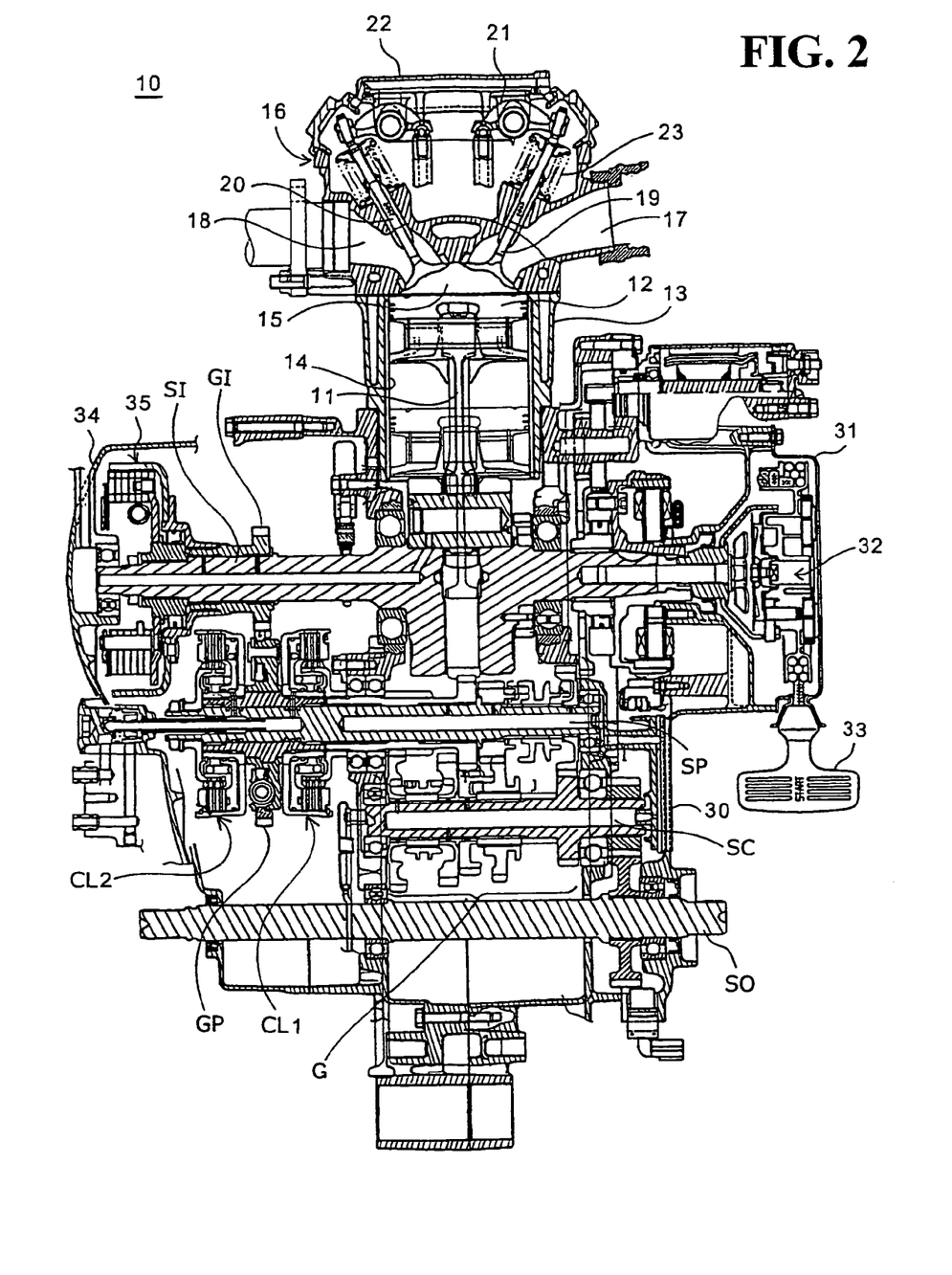
FIG. 2 is a cross-sectional view of an internal combustion engine according to an embodiment of the present invention.

FIG. 2 is a cross-sectional view of an internal combustion engine to which a hydraulic control apparatus of an automatic transmission is applied according to an embodiment of the present invention. An internal combustion engine 10 is a 4-cycle single cylinder engine, which is mounted on, e.g., a 4-wheeled buggy vehicle (irregular or rough terrain traveling buggy type vehicle). A crankshaft SI is journaled for rotation by a crankcase 30 and a piston 12 is connected to the crankshaft SI via a connecting rod 11. The piston 12 slidably moves in a cylinder 14 provided in a cylinder block 13. A cylinder head 16 is secured to the cylinder block 13 from above in FIG. 2. A combustion chamber 15 adapted to burn an air-fuel mixture is defined by the cylinder block 16, the cylinder 14 and the piston 12. A valve 19 that controls air intake from an intake port 17 and a valve 20 that controls exhaust to an exhaust port 18 and an ignition plug (not shown) adapted to ignite compressed air-fuel mixture are provided on the cylinder head 16 covered by a cylinder head cover 22. The opening and closing operations of the valves 19, 20 are controlled by a rocker arm 21 swung by following the rotation of a camshaft (not shown) and a valve spring 23 formed of a coil spring.

A starter 32 is provided at the right-hand end of the crankshaft SI in the figure to start the internal combustion engine 10 by a manual operation. A grip 33 provided on a cover 31 of the starter 32 is connected to one end of a long rope wound around a bobbin joined fixedly to the crankshaft SI. Thus, the crankshaft SI can be directly rotated by hand power by pulling the grip 33.

A starting clutch 35 covered by a clutch cover 34 is provided at the left-hand end of the crankshaft SI. The starting clutch 35 is an automatic centrifugal clutch and is configured such that the rotary driving force of the crankshaft SI is transmitted to an output gear GI when engine speed, namely, the rotation number of the crankshaft SI reaches a predetermined value (e.g., 2000 rpm). The rotary driving force produced in the crankshaft SI is transmitted from the output gear GI, via a primary gear GP, and a shift gear train G, finally to an output shaft SO. The shift gear train G is composed of a plurality of gear pairs carried on the primary shaft SP and a counter shaft SC as a sub shaft. The automatic transmission is composed of the entire unit ranging from the primary gear GP to the output shaft SO. A twin clutch included in the entire unit includes a first clutch CL1 and a second clutch CL2 disposed on the left-hand end of the primary shaft SP in the figure. The first clutch CL1 and the second clutch CL2 are respectively disposed on the right-hand and left-hand of the primary gear GP. A hydraulic pressure generating source adapted for hydraulic control and an oil passage connected thereto are put together on the left-hand end of the primary shaft SP.

Figure 3:
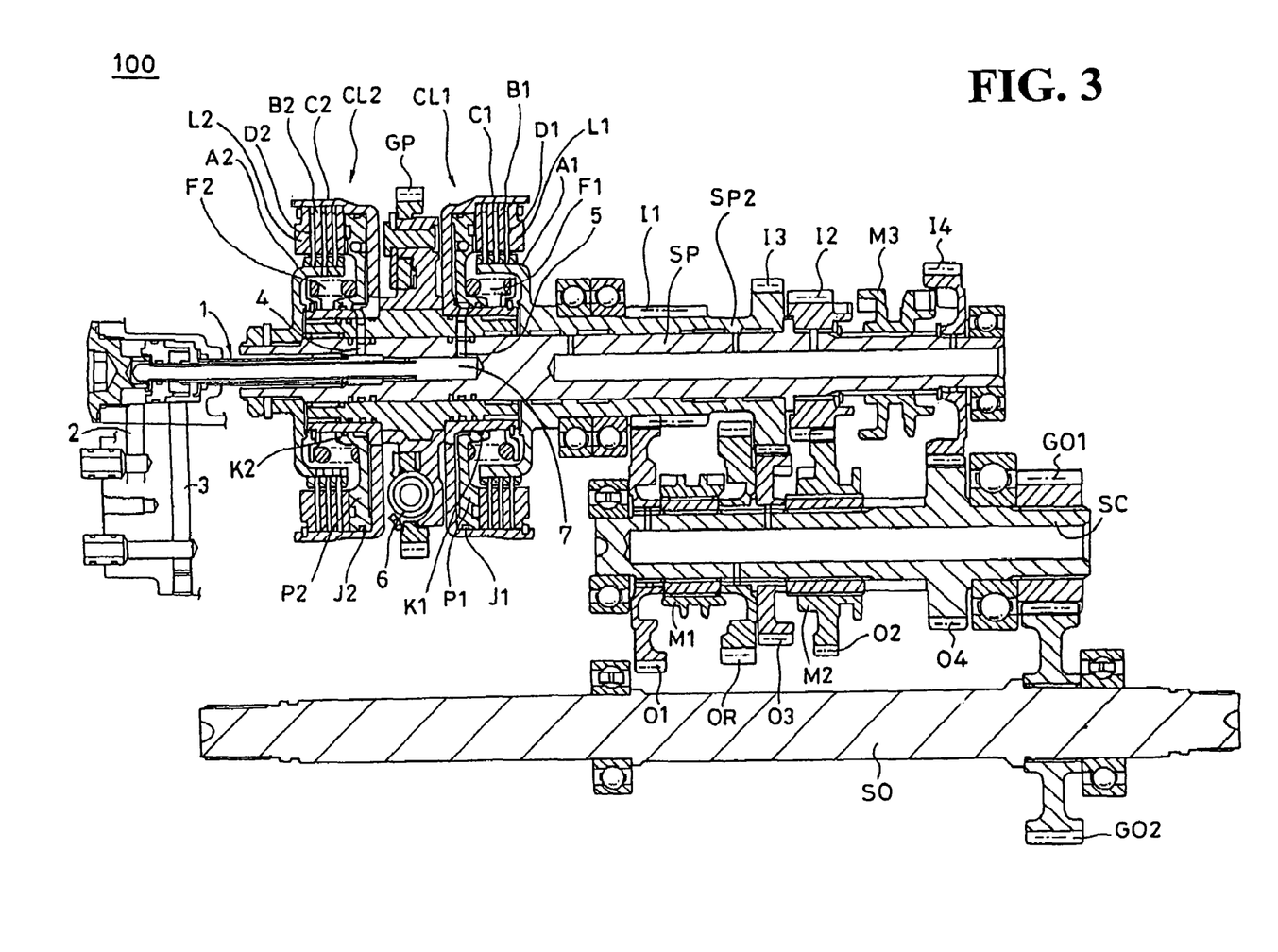
FIG. 3 is a cross-sectional view of an automatic transmission according to an embodiment of the present invention.

A detailed description is next made of the arrangement of the first and second clutches CL1 and CL2 and the oil passage structure resulting from the arrangement. FIG. 3 is an enlarged cross-sectional view of an essential portion of FIG. 2. The automatic transmission 100 is a multi-stage transmission with 4-speed forward and 1-speed reverse. The shifting operation for every speed ratio can be executed by a combination of on-off of hydraulic pressure applied to the first and second clutches CL1, CL2 and the axial sliding operation of a first sleeve M1, a second sleeve M2 and a third sleeve M3 serving as dog clutches in engagement with a shifting actuator (not shown).

The twin clutch includes the first clutch CL1 and the second clutch CL2 with the primary gear GP interposed therebetween. More specifically, the first and second clutches CL1 and CL2 are disposed back-to-back such that respective clutch cases (outer drums) C1, C2 for the clutches CL1, CL2 are disposed near the primary gear GP and inner drums A1, A2 are disposed apart from the primary gear GP.

In order to absorb any shock occurring during the transmission of a driving force, a shock-absorbing mechanism incorporating springs 6 is installed into the primary gear GP connected rotatably to the primary shaft SP. In the present invention, the first clutch CL1 and the second clutch CL2 have the same configuration having the same components combined with one another. Each of the first and second clutches CL1 and CL2 is substantially formed as a disk with a thickness. Hence, the first clutch CL1 is represented to describe its configuration below. In addition, component portions of the second clutch CL2 corresponding to those of the first clutch CL1 are indicated with parentheses.

The first clutch CL1 (CL2) includes a piston P1 (P2) that is inserted on the bottom of the clutch case C1 (C2) so as to be sealed with an inner oil seal K1 (K2) and an outer oil seal J1 (J2). The clutch case C1 (C2) is fixedly joined to the primary gear GP. When the working fluid is fed under pressure through an oil passage 5 (4) and an oil gallery 7 that is bored at the axial center of the primary shaft SP, the piston P1 (P2) is pushed out in the right-hand direction (left-hand direction)

in the figure. On other hand, when the pressure of the working fluid drops, the piston P1 (P2) is returned to its original position by the elastic force of a spring F1 (F2).

Three pressure plates B1 (B2) and a retaining plate L1 (L2) are disposed on the right-hand (left-hand) of the piston P1 (P2) in the figure. The pressure plates B1 (B2) are disposed adjacent to the piston P1 (P2), and connected to the clutch case C1 (C2) fixedly in the rotation direction and slidably in the axial direction. The retaining plate L1 (L2) is fixedly connected to the clutch case C1 (C2). Three clutch plates D (D2) are connected to the inner drum A1 (A2) fixedly in the rotation direction and slidably in the axial direction in such a way that they are alternately interposed between the three pressure plates B1 (B2) and the retaining plate L1 (L2) with respective slight gaps therebetween.

With the configuration described above, the rotary driving force of the primary gear GP only rotates the clutch case C1 (C2) as long as the piston P1 (P2) is not pushed out under hydraulic pressure. If the piston P1 (P2) is pushed out under hydraulic pressure to bring the pressure plates B1 (B2) and the clutch plates D1 (D2) into contact with each other to generate a frictional force therebetween, then the rotary driving force that is rotating the clutch case C1 (C2) is transmitted to the inner drum A1 (A2). In this case, controlling the magnitude of the hydraulic pressure can easily make a partial clutch engagement or the like.

An oil passage distributor 1 composed of a dual tube is fixedly inserted into the oil gallery 7 provided at the axial center of the primary shaft SP included in the automatic transmission 100. The hydraulic pressure applied to a supply oil passage 2 is transmitted from the inner tube of the oil passage distributor 1 via the oil passage 5 and drives the piston P1 of the first clutch CL1. On the other hand, the hydraulic pressure applied to a supply oil passage 3 is transmitted between the inner tube and outer tube of the oil passage distributor 1 and drives the piston P2 of the second clutch CL2.

The inner drum A1 of the first clutch CL1 is formed integrally with an outer primary shaft SP2, whereas the inner drum A2 of the second clutch CL2 is fixedly joined to the primary shaft SP. A 1st-speed drive gear I1 and a 3rd-speed drive gear I3 are integrally formed on the outer primary shaft SP2 journaled for rotation on the primary shaft SP. The 1st-speed drive gear I1 and the 3rd-speed drive gear I3 are constantly engaged with a 1st-speed driven gear O1 and a 3rd-speed driven gear O3, respectively, journaled for rotation on the counter shaft SC. A 2nd-speed drive gear I2 and a 4th-speed drive gear I4 journaled for rotation on the primary shaft SP are constantly engaged with a 2nd-speed driven gear O2 and a 4th-speed driven gear O4, respectively, rotated integrally with the counter shaft SC. An output gear GO1 fixedly joined to the right-hand end of the counter shaft SC in the figure is engaged with an output gear GO2 fixedly joined to the output shaft SO. A reverse gear journaled for rotation on the counter shaft SC is constantly engaged with an input gear (not shown) of a reverse output shaft.

Figure 1:
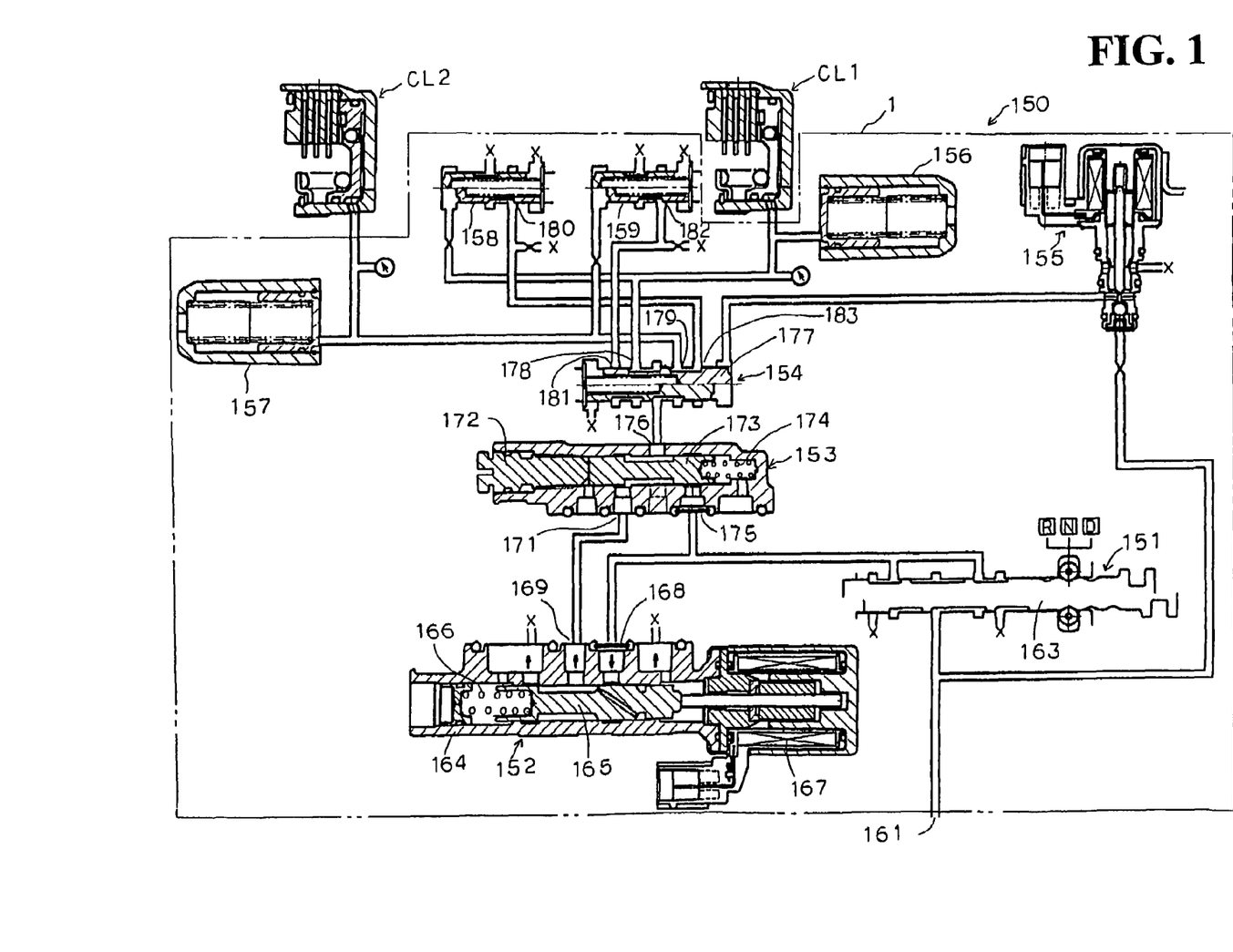
FIG. 1 is a hydraulic circuit diagram of a hydraulic control apparatus according to an embodiment of the present invention.

FIG. 1 is a hydraulic circuit diagram of the hydraulic control apparatus that controls the twin clutch of the transmission described above. The hydraulic control apparatus 150 includes in a valve body, i.e., the oil passage distributor 1, a manual valve 151, a linear solenoid valve 152, an emergency valve 153, a changeover valve 154, a selector solenoid 155, a pair of accumulators 156, 157, and a pair of orifice control valves (hydraulic control valves) 158, 159. A working fluid is delivered from a hydraulic pump (not shown) to the valve body 1 via a working fluid supply port 161.

The manual valve 151 includes a spool 163 that slides in the manual valve 151 in response to operation of a shift lever (not shown), that is, operation of selecting a drive (D), reverse (R) or neutral (N) position. The linear solenoid valve 152 includes a spool 165 that slides in a valve body 164. The spool 165 is constantly biased toward a solenoid 167 by a compression coil spring 166. When the solenoid 167 is energized, the spool 165 is displaced in a direction that compresses the compression coil spring 166. More specifically, when the solenoid 167 is turned off, the spool is located at a position (valve open position) where the working fluid can be supplied. When the solenoid 167 is turned on, the spool 165 is displaced at a position (valve closed position) where the working fluid cannot be supplied. FIG. 1 illustrates a state where the solenoid 167 is energized to keep the spool 165 at a valve closed position.

When the linear solenoid valve 152 is opened, the working fluid enters a working fluid inlet port 168, is discharged from a working fluid outlet port 169 and delivered to a working fluid inlet port 171 of the emergency valve 153. The emergency valve 153 includes a spool cap screw 172, a spool 173, and a compression coil spring 174. The spool 173 is normally biased toward the spool cap screw 172 by the compression coil spring 174 to open the emergency valve 153. Thus, the emergency valve 153 only executes a function of providing a passage that relays the working fluid delivered from the linear solenoid valve 152 to the changeover valve 154. If the linear solenoid valve 152 fails to stop in an interrupting state; however, the emergency valve 153 executes a function of delivering the working fluid to the changeover valve 154 with the liner solenoid valve 152 bypassed. More specifically, the spool cap screw 172 is screwed in to displace the spool 173 so that an auxiliary working fluid inlet port 175 may communicate with a working fluid outlet 176. Thus, the working fluid from the manual valve 151 can be fed to the changeover valve 154 with the linear solenoid valve 152 bypassed.

The selector solenoid 155 interrupts/supplies hydraulic pressure adapted to drive a spool 177 of the changeover valve 154. The changeover valve 154 sets the destination of the working fluid fed from the emergency valve 153 as either the first clutch CL1 or the second clutch CL2 in response to the position of the spool 177.

A first working fluid outlet port 178 of the changeover valve 154 is connected to a first accumulator 156, the first clutch CL1, and a low-side orifice control valve 158. A second working fluid outlet port 179 of the changeover valve 154 is connected to a second accumulator 157, the second clutch CL2, and a high-side orifice control valve 159. An outlet port 180 of a low-side orifice control valve 158 is connected to a first working fluid return port 183 of the changeover valve 154. An outlet port 182 of a high-side orifice control valve 159 is connected to a second working fluid return port 181 of the changeover valve 154. Return oil is discharged from an oil passage end denoted with symbol X in the figure to the outside of the valve body 1 to mix with other return oil from another route. Part of the mixed return oil is returned to the valve body 90 for reuse via an oil tank, an oil pump, and an oil filter.

Figure 4:
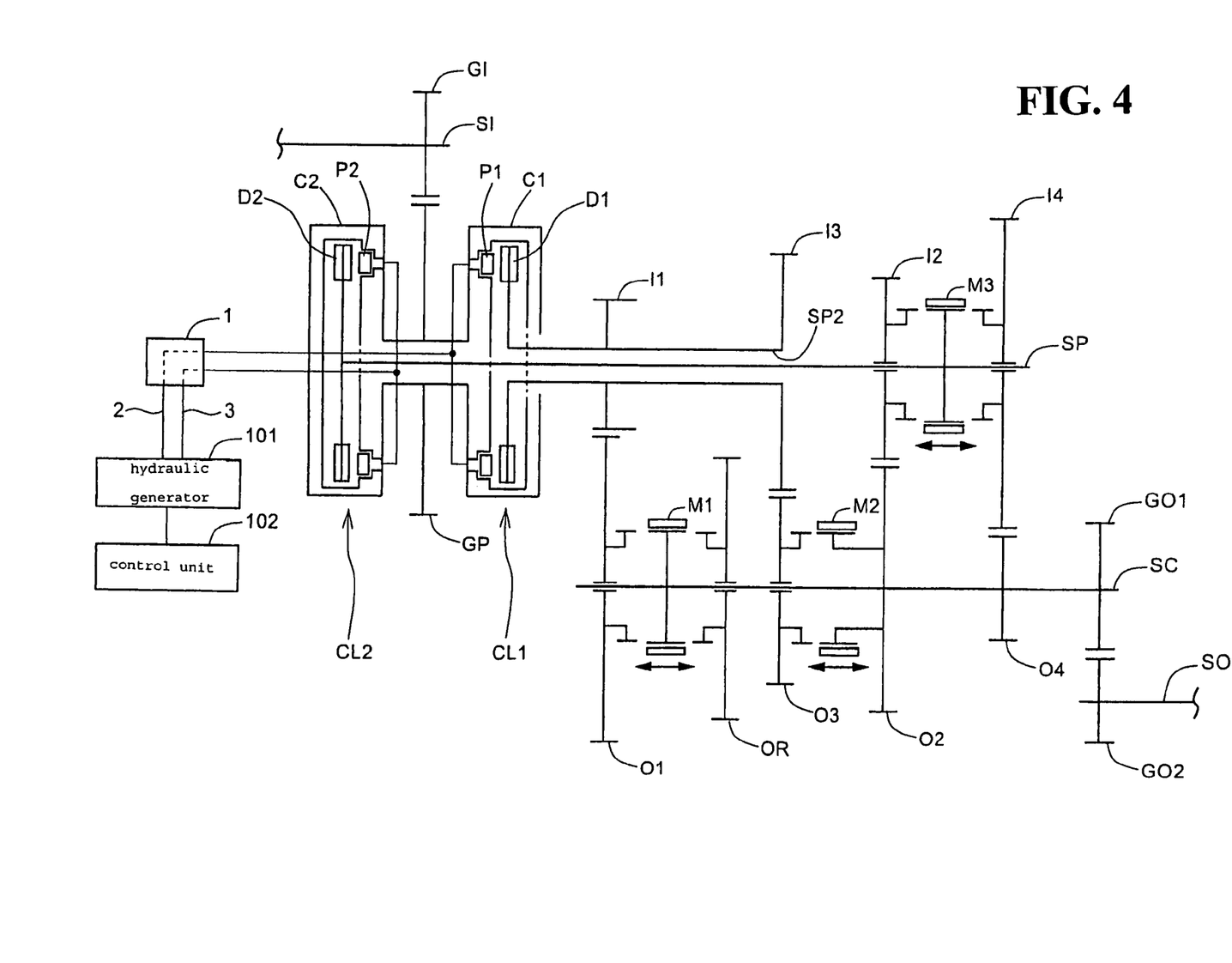
FIG. 4 is a schematic of the automatic transmission according to the embodiment of the present invention.

Shift operation in the automatic transmission is described below. FIG. 4 is a schematic of the automatic transmission according to the invention. Like reference numerals and symbols described above denote the identical or corresponding parts. A hydraulic generator 101 which exercises hydraulic control on the first clutch CL1 and the second clutch CL2 independently of each other is driven in response to a signal from a control unit 102. The axial sliding operation of the first to third sleeves M1 to M3 is carried out by an actuator or the like not shown in conjunction with the operation of the twin clutch.

A description is made below of the relationship between hydraulic pressure applied or not applied to the twin clutch and the sliding operation of the first to third sleeves M1 to M3, for each speed ratio. At first, for the neutral position, when the manual valve 151 takes the neutral position, the hydraulic pressure applied to the linear solenoid valve 152 is interrupted. On the other hand, while the hydraulic pressure applied to the selector solenoid 155 is not interrupted, the power supply of the selector solenoid 155 is turned on to interrupt the hydraulic pressure applied otherwise to the changeover valve 154. Thus, the hydraulic pressure applied to any of the first clutch CL1 and the second clutch CL2 is interrupted, so that the primary gear GP and the clutch cases C1 and C2 integrally enter an idle state with respect to the primary shaft SP.

For the first speed ratio, the manual valve 151 is located at a drive position and the hydraulic pressure is connected to the linear solenoid 152 and the selector solenoid 155. The power supply of the selector solenoid 155 is turned on to cause the spool of the changeover valve 154 to connect the hydraulic pressure to the first clutch CL1. Consequently, the hydraulic pressure of the working fluid is applied to the first clutch CL1, whereby the rotary driving force of the primary gear GP is transmitted to the outer primary shaft SP2. The first sleeve M1 connected to the counter shaft SC fixedly in the rotation direction and slidably in the axial direction is slid toward and coupled to the 1st-speed driven gear O1. Thus, the rotation of the 1st-speed drive gear I1 is transmitted to the counter shaft SC via the 1st-speed driven gear O1 and the first sleeve M1. The rotation of the counter shaft SC is transmitted to the output shaft SO via the output gear GO1 and the output gear GO2.

Next, for the second speed ratio, the destination of the working fluid is switched from the first clutch CL1 to the second clutch CL2. While the position of the manual valve 151 is the same for the first speed ratio, the power supply of the selector solenoid is turned off. This causes the hydraulic pressure from the changeover valve 155 to be connected to the changeover valve 154, so that the working fluid pressure from the linear solenoid valve 152 is connected to the second clutch CL2. Thus, the second clutch CL2 is operated to thereby transmit the rotary driving force of the primary gear GP to the primary shaft SP. Along with this operation, the third sleeve M3 connected to the primary shaft SP fixedly in the rotation direction and slidably in the axial direction is slid toward and coupled to the 2nd speed drive gear I2. Thus, the rotary driving force is transmitted to the counter shaft SC via the gear train composed of the 2nd speed drive gear I2 and the 2nd speed driven gear O2.

For the third speed ratio, the destination of the hydraulic pressure is again switched from the second clutch CL2 to the first clutch CL1. The position of the manual valve 151 is the same for the first and second speed ratios and the changeover valve 154 is switched in the same manner as for the first speed ratio. The second sleeve M2 connected to the counter shaft SC fixedly in the rotation direction and slidably in the axial direction is slid toward and coupled to the third driven gear O3. Thus, the rotary driving force is transmitted to the counter shaft SC via a gear train composed of the 3rd speed drive gear I3 and the 3rd speed driven gear O3.

For the fourth speed ratio, the destination of the hydraulic pressure is again switched from the first clutch CL1 to the second clutch CL2. The position of the manual valve 151 is the same for the first to third speed ratios and the changeover valve 154 is switched in the same manner as for the second speed ratio. When the second clutch CL2 is operated, the rotary driving force of the primary gear GP is transmitted to the primary shaft SP, whereby the third sleeve is slid toward and coupled to the 4th speed drive gear I4. Thus, the rotary driving force is transmitted to the counter shaft SC via a gear train composed of the 4th speed drive gear I4 and the 4th driven gear O4.

For the reverse speed ratio, the manual valve 151 is shifted to the reverse position and the hydraulic pressure is connected to the first clutch CL1 as with the first speed ratio. Along with this connection, the 1st speed driven gear O1 slidable in the axial direction is coupled to the reverse gear OR, whereby the power is transmitted to the output shaft SO via a reverse idle gear not shown.

As described above, the automatic transmission 100 is configured such that each speed change gear pair are constantly engaged with each other and the two clutches alternately apply and release the rotary driving force to and from the speed change gears adjacent to each other. Therefore, shift shock is small and quick shifting is executable.

In particular, since the first and second clutches CL1 and CL2 are provided with the orifice control valves 158 and 159, respectively, upon interrupt the hydraulic pressure of the working fluid can be moderately reduced in any of upshift and downshift.

Furthermore, the accumulators 156 and 157 provided for the first and second clutches CL1 and CL2, respectively, operate to accumulate the pressure of the working fluid therein. Therefore, the working fluid can be quickly supplied to each of the first and second clutches CL1 and CL2. This enhances response upon switching of the hydraulic circuit.

Incidentally, the present embodiment exemplifies the transmission that uses, as a starting clutch, the automatic centrifugal clutch, which eliminates a creep prevention controller. However, the present invention is not limited to this transmission and can be applied to a transmission equipped with a linear solenoid for creep prevention.

In an automatic transmission with shift gears with five or six speeds as well as four speeds, the present invention is also applicable to a configuration in which the first and second clutches CL1 and CL2 are alternately switched for use at odd-numbered speed ratios and even-numbered speed ratios.

In addition, as shown in FIG. 3, the first and second clutches CL1 and CL2 are disposed back-to-back with the primary gear GP of the primary shaft SP interposed therebetween. Therefore, the oil passages 4, 5 have only to be disposed circumferentially linearly from the oil gallery 7 provided at the axial center of the primary shaft SP. The first and second clutches CL1 and CL2 are each controlled by such an oil passage simple in shape and short in entire length. The hydraulic source and the two oil passage can be put together on one end side of the primary shaft SP. Therefore, the entire length of the oil passages can be reduced. In addition, equalizing the lengths of the two oil passages can easily uniformize the response of the hydraulic control. Further, the first and second clutches CL1 and CL2 are composed of common component parts, whereby the manufacturing processes can be significantly reduced. It is not necessary that the crankcase is furnished with a special oil passage. Therefore, the basic configuration of the crankcase can be shared by the manual transmission vehicle, which can reduce production processes. Since the clutch is provided on one end side of the primary shaft SP, the external dimension of the clutch has no influence on the determination of the center distance between the primary shaft and the counter shaft. This reduces the center distance, whereby a small-sized and lightweight automatic transmission can be constructed.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A hydraulic control apparatus for an automatic transmission, comprising:
   a main shaft connected to an output shaft of an internal combustion engine via any one of a first clutch and a second clutch both actuated under hydraulic pressure;
   a gear train transmitting rotation of the main shaft to a transmission output shaft; and
   a hydraulic circuit adapted to transmit pressure of a working fluid to the first clutch and the second clutch is provided for each of the first and second clutches individually, the hydraulic circuit including:
      a first oil passage adapted to supply a working fluid to the first clutch;
      a second oil passage adapted to supply the working fluid to the second clutch; and
      a changeover valve adapted to connect the pressure of the working fluid to any one of the first oil passage and the second oil passage,
   wherein a speed ratio is determined by engagement and disengagement of the first and second clutches and engagement and disengagement of a dog clutch in the gear train.

2. The hydraulic control apparatus for an automatic transmission, according to claim 1, wherein the automatic transmission is a multi-stage automatic transmission, and the output shaft of the internal combustion engine is connected to the main shaft via the first clutch for an odd-numbered speed ratio and via the second clutch for an even-numbered speed ratio.

3. The hydraulic control apparatus for an automatic transmission, according to claim 2, wherein the hydraulic circuit further includes an orifice control valve provided at a guiding branch formed on each of midways of the first oil passage and the second oil passage.

4. The hydraulic control apparatus for an automatic transmission, according to claim 1, wherein the hydraulic circuit further includes an orifice control valve provided at a guiding branch formed on each of midways of the first oil passage and the second oil passage.

5. A hydraulic control apparatus for an automatic transmission, comprising:
   a main shaft connected to an output shaft of an internal combustion engine via any one of a first clutch and a second clutch both actuated under hydraulic pressure;
   a gear train transmitting rotation of the main shaft to a transmission output shaft; and
   a hydraulic circuit adapted to transmit pressure of a working fluid to the first clutch and the second clutch is provided for each of the first and second clutches individually, the hydraulic circuit including:
   a manual valve;
   a linear solenoid valve connected to an outlet of the manual valve;
   an emergency valve connected to an outlet of the manual valve and the linear solenoid valve; and
   a changeover valve connected to the emergency valve,
   wherein the working fluid from the manual valve is fed to the changeover valve via the linear solenoid valve and the emergency valve when the linear solenoid is operational, and the working fluid from the manual valve is fed to the changeover valve via the emergency valve, bypassing the linear solenoid valve when the linear solenoid has failed, and
   wherein a speed ratio is determined by engagement and disengagement of the first and second clutches and engagement and disengagement of a dog clutch in the gear train.

6. The hydraulic control apparatus for an automatic transmission, according to claim 5, further comprising a selector solenoid, said selector solenoid controlling a position of a spool of the changeover valve between first and second positions, wherein said changeover valve supplies the working fluid to the first clutch when the spool is in the first position and the changeover valve supplies working fluid to the second clutch when the spool is in the second position.

7. The hydraulic control apparatus for an automatic transmission, according to claim 5, wherein the automatic transmission is a multi-stage automatic transmission, and the output shaft of the internal combustion engine is connected to the main shaft via the first clutch for an odd-numbered speed ratio and via the second clutch for an even-numbered speed ratio.

8. The hydraulic control apparatus for an automatic transmission, according to claim 7, further comprising a selector solenoid, said selector solenoid controlling a position of a spool of the changeover valve between first and second positions, wherein said changeover valve supplies the working fluid to the first clutch when the spool is in the first position and the changeover valve supplies working fluid to the second clutch when the spool is in the second position.

9. A hydraulic control apparatus for an automatic transmission, the automatic transmission including a main shaft connected to an output shaft of an internal combustion engine via any one of a first clutch and a second clutch both actuated under hydraulic pressure, and a gear train transmitting rotation of the main shaft to a transmission output shaft, said hydraulic control apparatus comprising:
   a first oil passage adapted to supply a working fluid to the first clutch;
   a second oil passage adapted to supply the working fluid to the second clutch;
   a changeover valve adapted to connect the pressure of the working fluid to any one of the first oil passage and the second oil passage; and
   an orifice control valve provided at a guiding branch formed on each of midways of the first oil passage and the second oil passage.

10. The hydraulic control apparatus for an automatic transmission, according to claim 9, further comprising an accumulator provided at a second guiding branch, in addition to the guiding branch formed on each of the midways of the first oil passage and the second oil passage.

11. The hydraulic control apparatus for an automatic transmission, according to claim 10, wherein the automatic transmission is a multi-stage automatic transmission, and the output shaft of the internal combustion engine is connected to the main shaft via the first clutch for an odd-numbered speed ratio and via the second clutch for an even-numbered speed ratio.

12. The hydraulic control apparatus for an automatic transmission, according to claim 10, wherein the hydraulic circuit comprises:
   a manual valve;
   a linear solenoid valve connected to an outlet of the manual valve;
   an emergency valve connected to an outlet of the manual valve and the linear solenoid valve; and
   a changeover valve connected to the emergency valve,
   wherein the working fluid from the manual valve is fed to the changeover valve via the linear solenoid valve and the emergency valve when the linear solenoid is operational, and the working fluid from the manual valve is fed to the changeover valve via the emergency valve, bypassing the linear solenoid valve when the linear solenoid has failed.

13. The hydraulic control apparatus for an automatic transmission, according to claim 12, further comprising a selector solenoid, said selector solenoid controlling a position of a spool of the changeover valve between first and second positions, wherein said changeover valve supplies the working fluid to the first clutch when the spool is in the first position and the changeover valve supplies working fluid to the second clutch when the spool is in the second position.

14. The hydraulic control apparatus for an automatic transmission, according to claim 9, wherein the automatic transmission is a multi-stage automatic transmission, and the output shaft of the internal combustion engine is connected to the main shaft via the first clutch for an odd-numbered speed ratio and via the second clutch for an even-numbered speed ratio.

15. The hydraulic control apparatus for an automatic transmission, according to claim 9, wherein the hydraulic circuit comprises:
- a manual valve;
- a linear solenoid valve connected to an outlet of the manual valve;
- an emergency valve connected to an outlet of the manual valve and the linear solenoid valve; and
- a changeover valve connected to the emergency valve, wherein the working fluid from the manual valve is fed to the changeover valve via the linear solenoid valve and the emergency valve when the linear solenoid is operational, and the working fluid from the manual valve is fed to the changeover valve via the emergency valve, bypassing the linear solenoid valve when the linear solenoid has failed.

16. The hydraulic control apparatus for an automatic transmission, according to claim 15, further comprising a selector solenoid, said selector solenoid controlling a position of a spool of the changeover valve between first and second positions, wherein said changeover valve supplies the working fluid to the first clutch when the spool is in the first position and the changeover valve supplies working fluid to the second clutch when the spool is in the second position.

* * * * *